(12) United States Patent
Chen et al.

(10) Patent No.: US 10,103,764 B2
(45) Date of Patent: Oct. 16, 2018

(54) WEARABLE DEVICE AND METHOD FOR INFORMATION DELIVERY

(71) Applicant: Taiwan Biophotonic Corporation, Zhubei (TW)

(72) Inventors: Jyh-Chern Chen, Zhubei (TW); Yu-Tang Li, Zhubei (TW); Ting-Ju Chen, Zhubei (TW); Wei-Ping Huang, Zhubei (TW); Chih-Hsun Fan, Zhubei (TW)

(73) Assignee: TAIWAN BIOPHOTONIC CORPORATION, Zhubei (TW)

( * ) Notice: Subject to any disclaimer, the term of this patent is extended or adjusted under 35 U.S.C. 154(b) by 0 days.

(21) Appl. No.: 15/279,438

(22) Filed: Sep. 29, 2016

(65) Prior Publication Data
US 2017/0093451 A1 Mar. 30, 2017

Related U.S. Application Data

(60) Provisional application No. 62/234,674, filed on Sep. 30, 2015.

(51) Int. Cl.
*H04B 1/3827* (2015.01)
*G06F 3/0362* (2013.01)
(Continued)

(52) U.S. Cl.
CPC ............ *H04B 1/385* (2013.01); *G04G 21/00* (2013.01); *G06F 1/163* (2013.01); *G06F 3/015* (2013.01); *G06F 3/0346* (2013.01); *G06F 3/0362* (2013.01); *G09G 5/00* (2013.01); *H04W 4/80* (2018.02); *G06F 3/147* (2013.01); *G09G 2320/08* (2013.01); *G09G 2340/0492* (2013.01); *G09G 2340/14* (2013.01); *G09G 2340/145* (2013.01); *G09G 2354/00* (2013.01); *H04B 2001/3855* (2013.01); *H04B 2001/3861* (2013.01)

(58) Field of Classification Search
CPC ......... H04B 1/385; G06F 1/163; G06F 3/015; G06F 3/0346; G09G 2320/08; G09G 2340/0464; G09G 2340/0492; G09G 2340/145; G09G 2354/00
USPC ....................................... 455/41.2
See application file for complete search history.

(56) References Cited

U.S. PATENT DOCUMENTS

| 4,041,692 A | * | 8/1977 | Marshino | ............... G04G 5/02 |
| | | | | 368/240 |
| 5,359,578 A | * | 10/1994 | Truini | .................. G04B 19/00 |
| | | | | 368/223 |

(Continued)

FOREIGN PATENT DOCUMENTS

CN 201410796026.1 * 12/2014

*Primary Examiner* — Edward Urban
*Assistant Examiner* — Ralph H Justus
(74) *Attorney, Agent, or Firm* — Chieh-Mei Wang

(57) ABSTRACT

A wearable device for information delivery may comprise a physiological sensor, a microprocessor, a display and a wearable housing. The wearable device may effectively receive a signal, convert the signal into information and renders a layout on a display. A method for information delivery may comprise signal reception step, signal transformation step and information visualization step. The method may be extensively applied in a wearable device or a device comprising at least a physiological sensor, a microprocessor and a display.

12 Claims, 12 Drawing Sheets

(51) Int. Cl.
*G09G 5/38* (2006.01)
*G06F 1/16* (2006.01)
*G06F 3/0346* (2013.01)
*G06F 3/01* (2006.01)
*H04W 4/80* (2018.01)
*G09G 5/00* (2006.01)
*G04G 21/00* (2010.01)
*G06F 3/147* (2006.01)

(56) References Cited

U.S. PATENT DOCUMENTS

| | | | | |
|---|---|---|---|---|
| 6,556,222 | B1* | 4/2003 | Narayanaswami | G04G 9/0064 368/295 |
| 8,790,268 | B2* | 7/2014 | Al-Ali | A61B 5/08 340/573.1 |
| 2005/0151849 | A1* | 7/2005 | Fitzhugh | G04G 5/00 348/207.99 |
| 2008/0101161 | A1* | 5/2008 | Imai | G04C 17/02 368/71 |
| 2010/0094096 | A1* | 4/2010 | Petruzzelli | A61B 5/0205 600/300 |
| 2014/0073486 | A1* | 3/2014 | Ahmed | A61B 5/02405 482/9 |
| 2014/0139422 | A1* | 5/2014 | Mistry | G06F 3/014 345/156 |
| 2014/0307529 | A1* | 10/2014 | Terzian | G04G 9/02 368/82 |
| 2015/0253736 | A1* | 9/2015 | Watterson | G04G 21/04 368/10 |
| 2016/0259488 | A1* | 9/2016 | Chan | G06F 1/163 |
| 2016/0341568 | A1* | 11/2016 | Roush | G01C 22/006 |
| 2017/0269792 | A1* | 9/2017 | Xu | G06F 3/0481 |

\* cited by examiner

WEARABLE DEVICE AND METHOD FOR INFORMATION DELIVERY

FIELD

The subject matter herein generally relates to wearable device and method for information delivery.

BACKGROUND

Smart device has become a popular personal equipment over the past decade. It features compact volume with versatile functions so that people may receive and manage more and more information instantly. However, the improvement of wearable smart devices has slowed down, because the efficiency and operability is limited by the visible area of display screen and control buttons. Current commercialized products are designed to be wearable by scaling down a smart phone, and most of them are lack of the efficiency and accessibility of the information delivered by a wearable smart device.

Problems are indicated here and are not yet solved. First, time information is a basic and essential function to a wearable smart device. Conventional digital time may lead misinterpretation between numbers and may occupy most visible area on the display. Second, physiological parameters measured by a wearable device are usually presented in a quantitative manner with standard units, which is too obsolete for a user to learn how to interpret the meaning of the physiological parameters. Third, control buttons on a conventional wearable device are lack of ergonomic considerations and mechanical status to facilitate manipulation of information delivery.

Those drawbacks of current products hamper the diffusion and popularization of wearable devices. The present invention provides a solution to conquer those difficulties and further widens the application of wearable devices. In the present disclosure, the specific examples a device and a method for information delivery are disclosed for purpose of illustration and are not intended to limit the scope of the present disclosure.

BRIEF DESCRIPTION OF THE DRAWINGS

Implementations of the present technology will now be described, by way of example only, with reference to the attached figures.

FIG. 4A shows a layout comprising a first time indicator 946, which is embodied as an enlarged dot marking. FIG. 4B shows a layout comprising a second time indicator 947, which is embodied as an enlarged line marking. FIG. 4C shows a layout comprising a third time indicator 948, which is embodied as a colored curve connecting along the line markings. FIG. 4D shows a layout comprising a preset clock dial, the first, second, and third indicators and other GUIs.

FIG. 7A demonstrates the effect of layout orientation process 300 on a wearable smart device 900 with a square wearable housing. FIG. 7B demonstrates the effect of layout orientation process 300 on a wearable smart device 900 with a round wearable housing.

FIG. 8A demonstrates the effect of layout swapping process 500 on a wearable smart device 900 in use. FIG. 8B demonstrates the effect of layout swapping process 500 on a wearable smart device 900 in power saving mode.

FIG. 9A demonstrates an information delivery process 100 generating a layout comprising a group of optional icons. FIG. 9B demonstrates an information delivery process 100 generating a layout comprising rotated arrangement of the icons. FIG. 9C demonstrates an information delivery process 100 generating a layout comprising an enlarged selected icon.

FIG. 11A demonstrates layout swapping process 500 performed by a wearable smart device 900 comprising a rotatable watch bezel 976. FIG. 11B demonstrates layout swapping process performed by a wearable smart device 900 comprising a rotatable tread 977. FIG. 11C demonstrates layout swapping process performed by a wearable smart device 900 comprising a rotatable gear 978.

DETAILED DESCRIPTION

Figure 1:
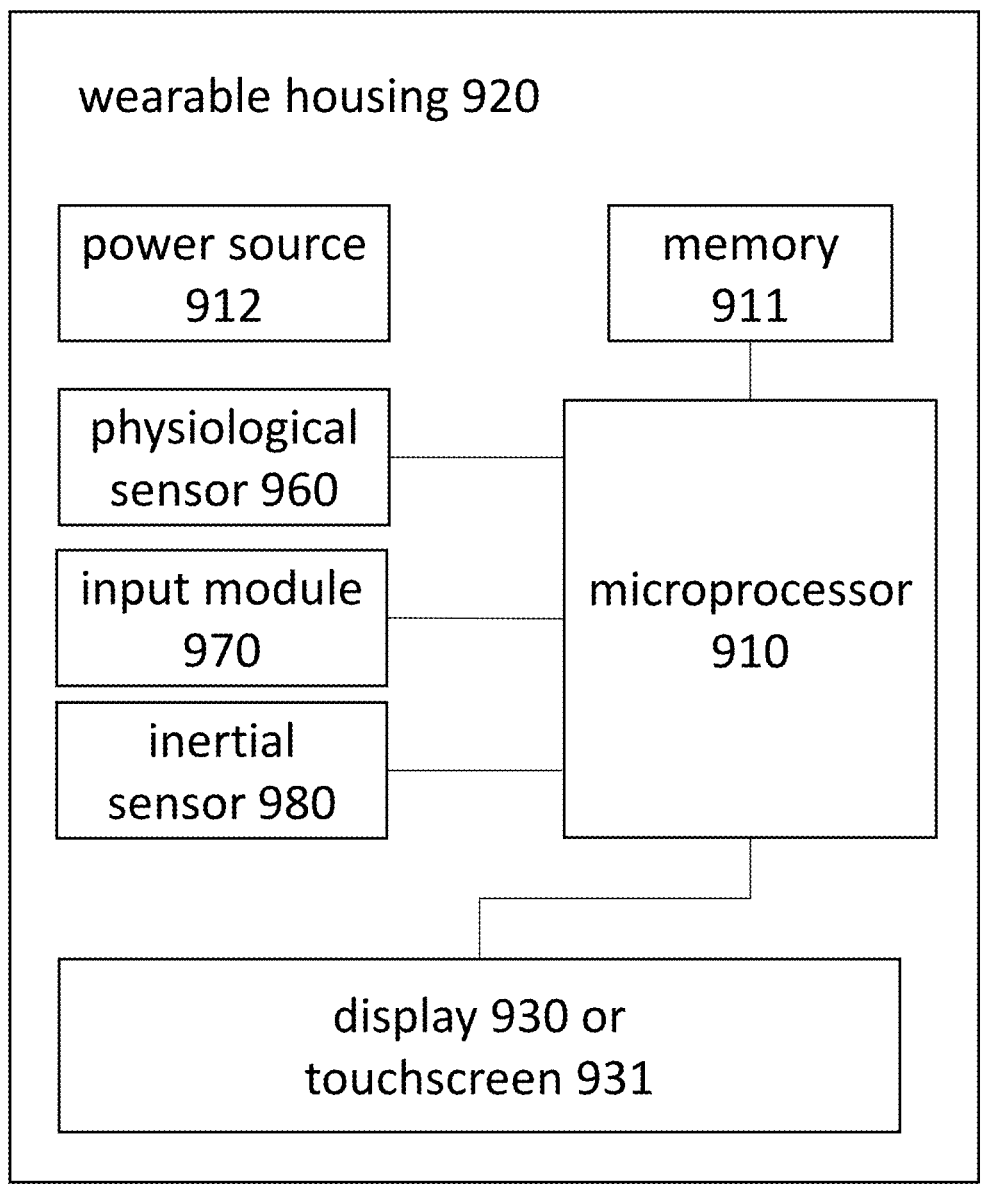
FIG. 1 illustrates a schematic diagram of a wearable smart device 900.
Figure 2:
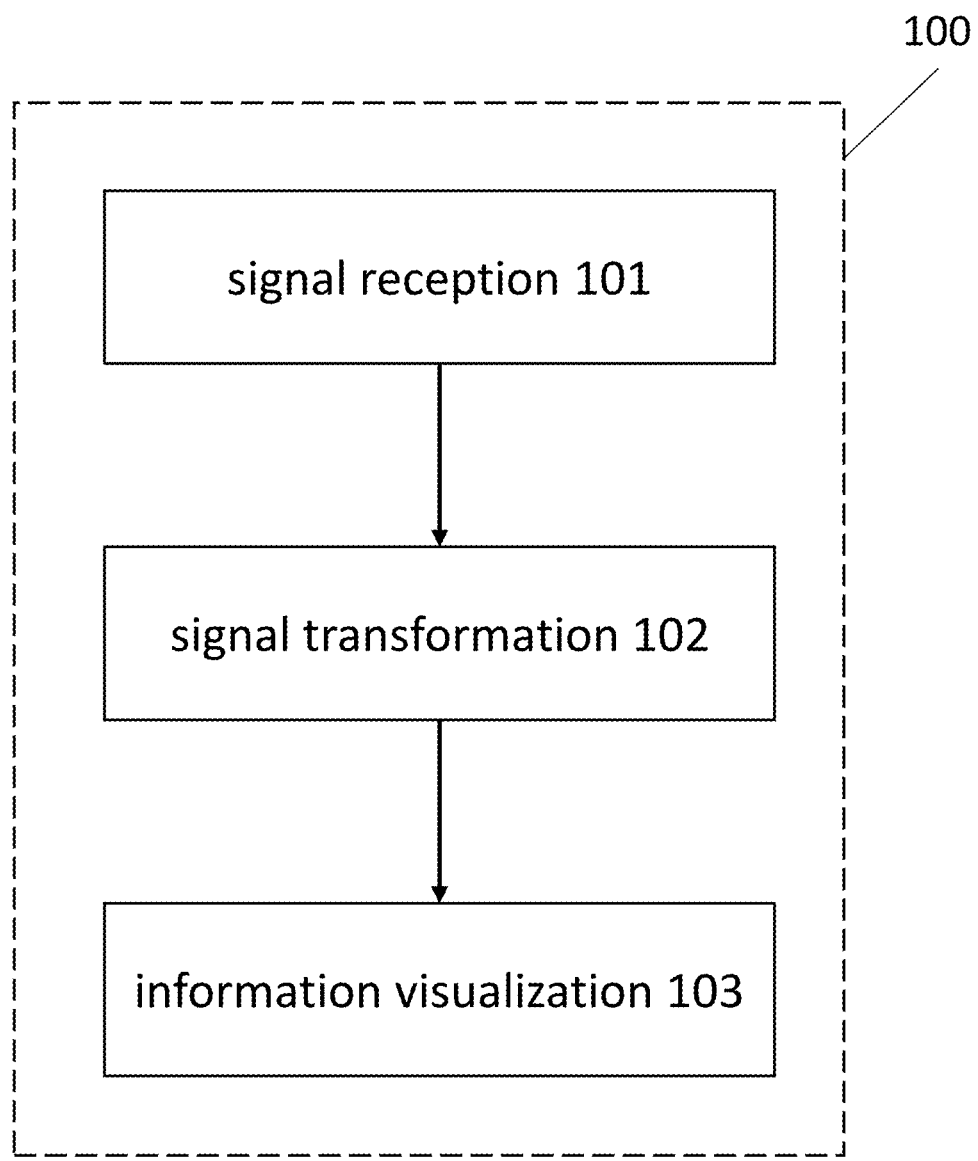
FIG. 2 illustrates a flow diagram of an information delivery process performed by a wearable smart device 900.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "comprising," when utilized, means "including, but not necessarily limited to"; it specifically indicates open-ended inclusion or membership in the so-described combination, group, series and the like.

A wearable device is an integration set of electronic modules, such as a microprocessor 910, a memory 911, a power source 912, and a display 930, in a wearable housing 920, and may further comprising a physiological sensor 949, an input module 970, or an inertial sensor 980 to perform specific information delivery process within the scope of present inventions. (FIG. 1). A wearable device 900 facilitates received signals to be processed into meaningful information and the information is then visualized and delivered to the user via the display 930. Specifically, a microprocessor 910 may receive the signals, process the signals into information, and deliver the information to a display according to the instruction sets for information delivery process stored in a memory 911. Consequently, a display 930 may render a layout shown on the screen of a display 930. Accordingly, the signals processed into information are more clear, concise, and efficient with the present inventions.

A microprocessor 910 may be a general purpose processor (for example, ARM based or 8086x microprocessor), an application specific processor, or an application specific integrated circuit, which are most available in mobile device, are capable of executing a series of process steps according to an instruction set embedded in a memory 911 and have an advantage of energy saving. Usually, a microprocessor 910 may have analogue input pins or an analogue to digital frontend to facilitate signal processing.

A memory 911 stores digital information assigned by the microprocessor 910 may work as a system buffer to deal with abundant signals (for example, from physiological sensor), may work as a storage to preserve the processed information, and may load an instruction set including a series of process steps to guide the operation of the microprocessor 910. A memory 911 may be volatile or non-volatile; in most mobile devices, volatile memory is embodied as random access memory (RAM), and non-volatile memory is embodied as flash memory. Also, a memory 911 may be integrated with a microprocessor 910.

A power source 912 provides power necessitated for the operation of the device. Both primary and secondary batteries may be a source of power supply used in a wearable smart device. With consideration of environmental and convenient issues, lithium based battery has a preferred energy density for mobile device applications at the age of present invention.

A display 930 is an electronic module capable of receiving graphic and/or text information and rendering a layout comprising visualized information. A display 930 may be embodied as a liquid crystal display, a light emitting diode display, an organic light emitting diode display, or an electronic paper; furthermore, a display 930 may be a touchscreen 931. A layout is an image comprising at least one graphic user interface (GUI) component, a type of interface that allows users to interact with electronic devices through graphical icons or visual indicators. As the animated designs of GUI components, a layout may be an animated image with certain combination of GUI components. In one example, a GUI component is an indicator representing the quantitative amount of a parameter.

A wearable housing 920 provides suitable container to settle all the components. A wearable housing 920 features its compact size, light weight, and robustness for mobile applications. A wearable housing 920 comprises a body attaching part and a module carrying part. The body attaching part may be an annular shape accessory, which attaches to human body by embracing body parts, and may be embodied as, a wrist band, a watch, or the like. Also, the body attaching part may be a patch shape accessory, which attaches to human body by biocompatible glues or gels, and may be embodied as a tape, a pad, a patch, or the like. A module carrying part may be configured in a square shape, round shape, or polygonal shape in order to be suitable for the embedded electronic components and be in line with the trend.

A physiological sensor 960 is a transducer converting a certain physiological characteristic of a part of human body, such as biopotential, thermal, mechanical, electrical, electrochemical or optical properties, into electrical signals. For example, electrocardiograph leads detect cardiac electric activity; electrical thermometer is able to detect body temperature; piezoelectric transducer may be used to detect the mechanical wave from arterial pulsation; impedance meter may detect electrical impedance indicating body fat index, biochemical sensor may detect biochemical compounds (for example, glucose); optical sensor may detect various optical characteristics of biological tissues and may indicate concentration or binding status of a biochemical compound (for example, glucose, lactose, or hemoglobin.) Also, multiple transducers may be integrated in a physiological sensor 960 to gather multiple physiological signals at a specific site. The physiological signals may be processed as physiological parameters by the microprocessor and stored in the memory. For example, the physiological signals may be the optical reflectance detected by an optical reflective sensor and processed as oxygen saturation (SpO2) or pulse rate.

An input module 970 is a type of hardware interface, which provides a tangible mechanical component, a transducer, and an electrical component, to allow a user to give an instruction to the wearable smart device 900. In the embodiments, the input module 970 may be a rotatable input module, wherein the rotation axis is about to perpendicular to the display 930, such as a rotatable bezel 976, a rotatable tread 977, or a rotatable gear 978. The physical displacement of a rotatable input module is detected by a transducer as an input signal and then delivered by an electrical component to the microprocessor 910. Furthermore, the input module may further comprise a physical switch receive a physical press and to trigger an electrical signal. In one embodiment of a rotatable bezel, a physical switch may receive a physical press from a user in perpendicular direction to the face of the rotatable bezel. In one embodiment of a rotatable tread, a physical switch may receive a physical press on a part of the rotatable tread. In one embodiment of a rotatable gear, a physical switch may receive a physical press parallel to the axis of the rotatable gear or a physical press perpendicular to the axis of the rotatable gear.

An inertial sensor 980 is configured to provide the signals generated from the movement status of a wearable smart device, such as the relative spatial position, acceleration, or inclination. For example, the inertial sensor may be an accelerometer or a gyroscope.

In general, a wearable smart device 900 is capable of executing information delivery process. The information delivery process 100 is an ordered combination comprising a series of steps involved in signal reception 101, signal transformation 102, and information visualization 103 (FIG.

2). In the embodiments, the steps of information delivery process may be recorded as a programmable media or an instruction set in a memory 911 and may be carried out by a microprocessor 910 and connected electronic components, such as a physiological sensor 960, an inertial sensor 980, an input module 970, and a display 930.

Signal is an electronic characteristic (for example, voltage or current), with any quantity exhibiting variation in time or variation in space, transduced by an electronic module from physical world. First, signal reception 101 refers to a step of information delivery process 100 that a wearable smart device 900 acquires signals from a transducer and delivers signals to the microprocessor 910. For example, a piezoelectric sensor may transduce the pulsation of blood pressure into a signal with voltage varying among time; a potentiometer may transduce the distance between mechanical parts into a signal with corresponding voltage. Second, signal transformation 102 refers to a step of information delivery process that the microprocessor 910 receives signals and transforms the signals into information. The information may be the digitalized signal itself, a parameter generated according to the features extracted from the signal, or the combination of multiple parameters. Third, information visualization 103 refers to a step of information delivery process that the microprocessor 910 generates a layout including at least a graphic user interface and a display 930 renders the layout.

An information delivery process 100 may be embodied as a time indicating process, a physiological process, a layout orientation process, a layout swapping process, or a function switching process.

Figure 3:
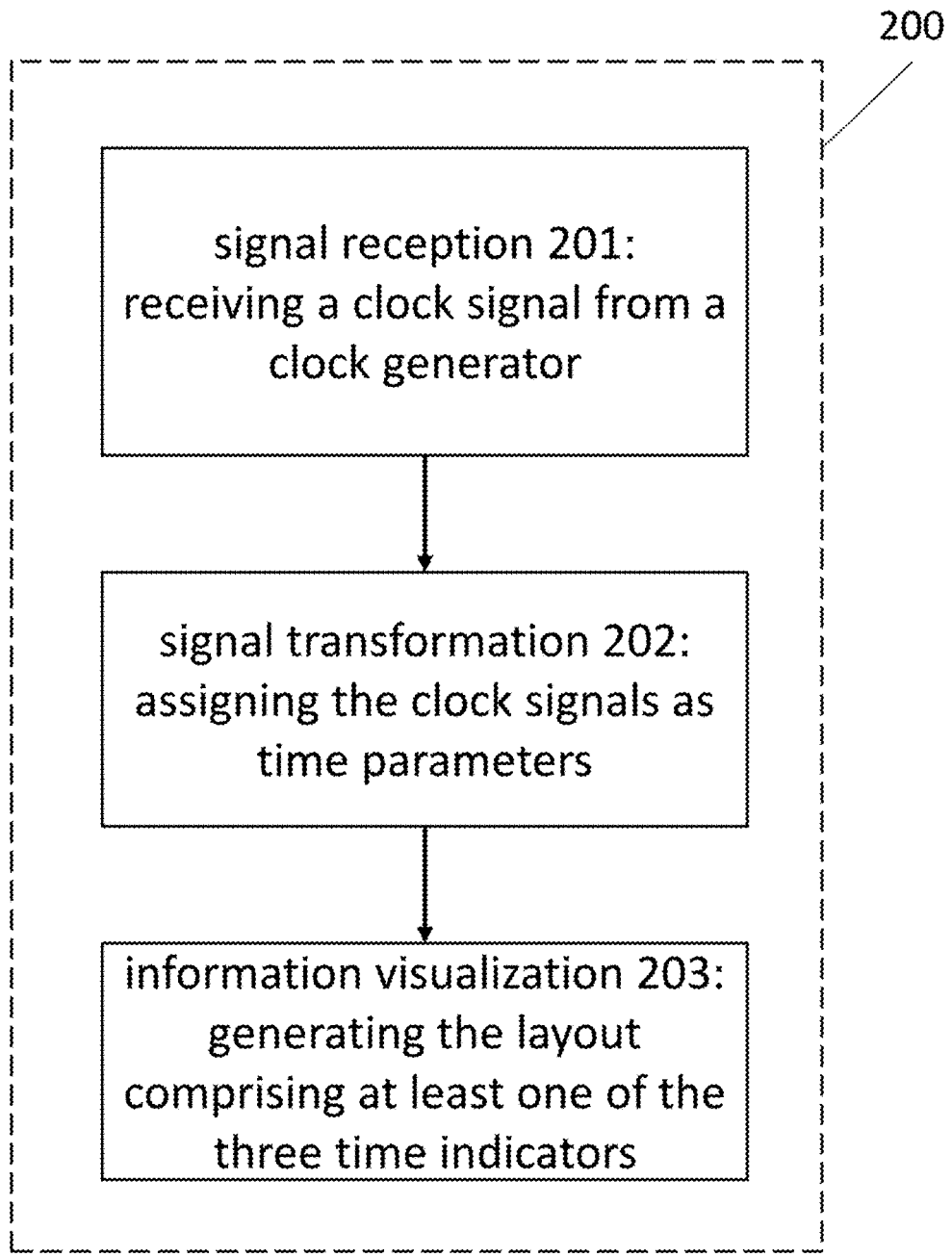
FIG. 3 illustrates a flow diagram of a time indicating process 200 performed by a wearable smart device 900.
Figure 4A:
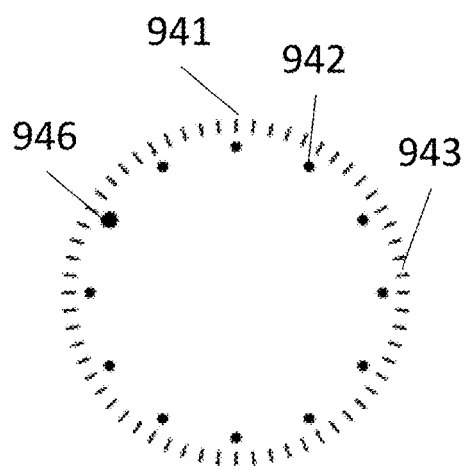
FIGS. 4A-4D illustrates the layouts, comprising a preset clock dial 941 and at least one time indicator, generated from a time indicating process performed by a wearable smart device 900.
Figure 4B:
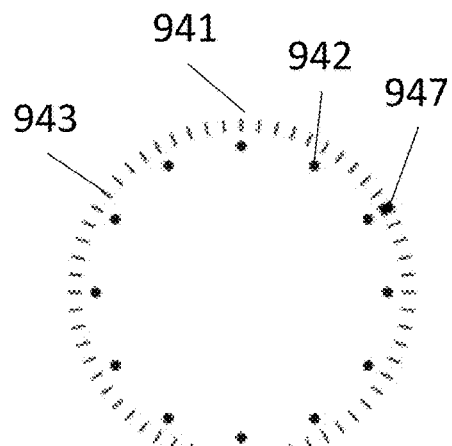
Figure 4C:
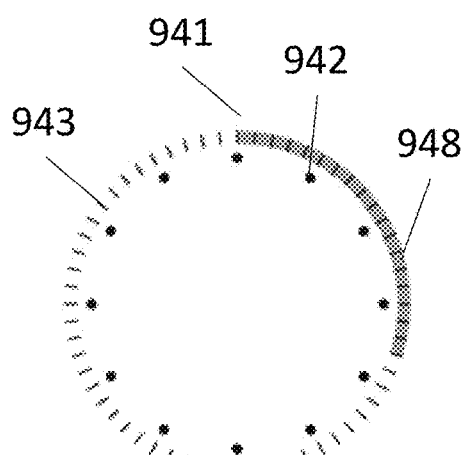
Figure 4D:
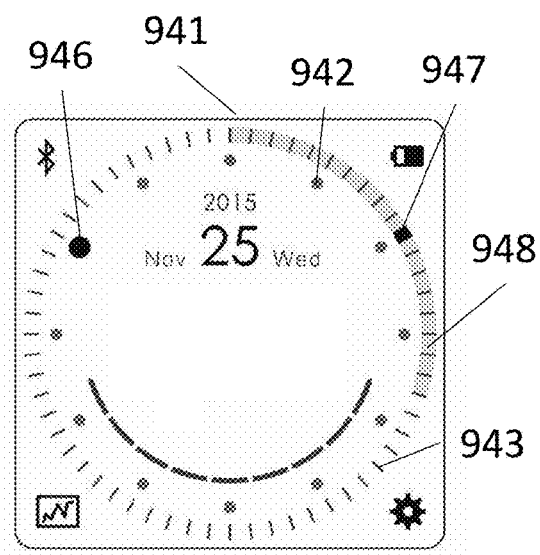

A wearable smart device 900 may comprise a microprocessor 910, a memory 911, a power source 912, a wearable housing 920, and a display 930 to perform an information delivery process, wherein the information delivery process may be embodied as a time indicating process 200 (FIG. 3). Signal reception step 201 is to receive a clock signal from a clock generator, which may be a part of microprocessor 910 or an external source (for example, quartz piezo-electric oscillator). Then, signal transformation step 202 is to assign the clock signals as time parameters, such as hour, minute, and second parameters. Furthermore, information visualization step 203 is to generate the layout comprising at least one of the three time indicators according to corresponding time parameter by the microprocessor 910. In one embodiment, a layout comprises a preset clock dial 941 and at least a time indicator. A preset clock dial 941 may comprise of twelve dot markings 942 and sixty line markings 943 dividing the clock dial in equal central angle. A first time indicator 946 is enlarged over the dot marking 942 on the preset clock dial 941 at the location of corresponding time parameter. A second time indicator 947 is enlarged over the line marking on the preset clock dial at the location of corresponding time parameter. A third time indicator 948 is a colored curve starting from a starting line marking 943 to an ending line marking 943 of corresponding time parameter. In one embodiment shown in FIG. 4A-4C, the lay out comprising a preset clock dial 941 and one of the time indicators. As shown in FIG. 4A, the first time indicator 946 is an enlarged dot marking indicating ten. As shown in FIG. 4B, the second time indicator 947 is an enlarged line marking indicating ten. As shown in FIG. 4C, a third time indicator 948 is a colored curve connecting along the line markings 943, which indicates eighteen. Also, the layout may further comprise date information and other device status (for example, battery usage) as shown in FIG. 4D.

Figure 5:
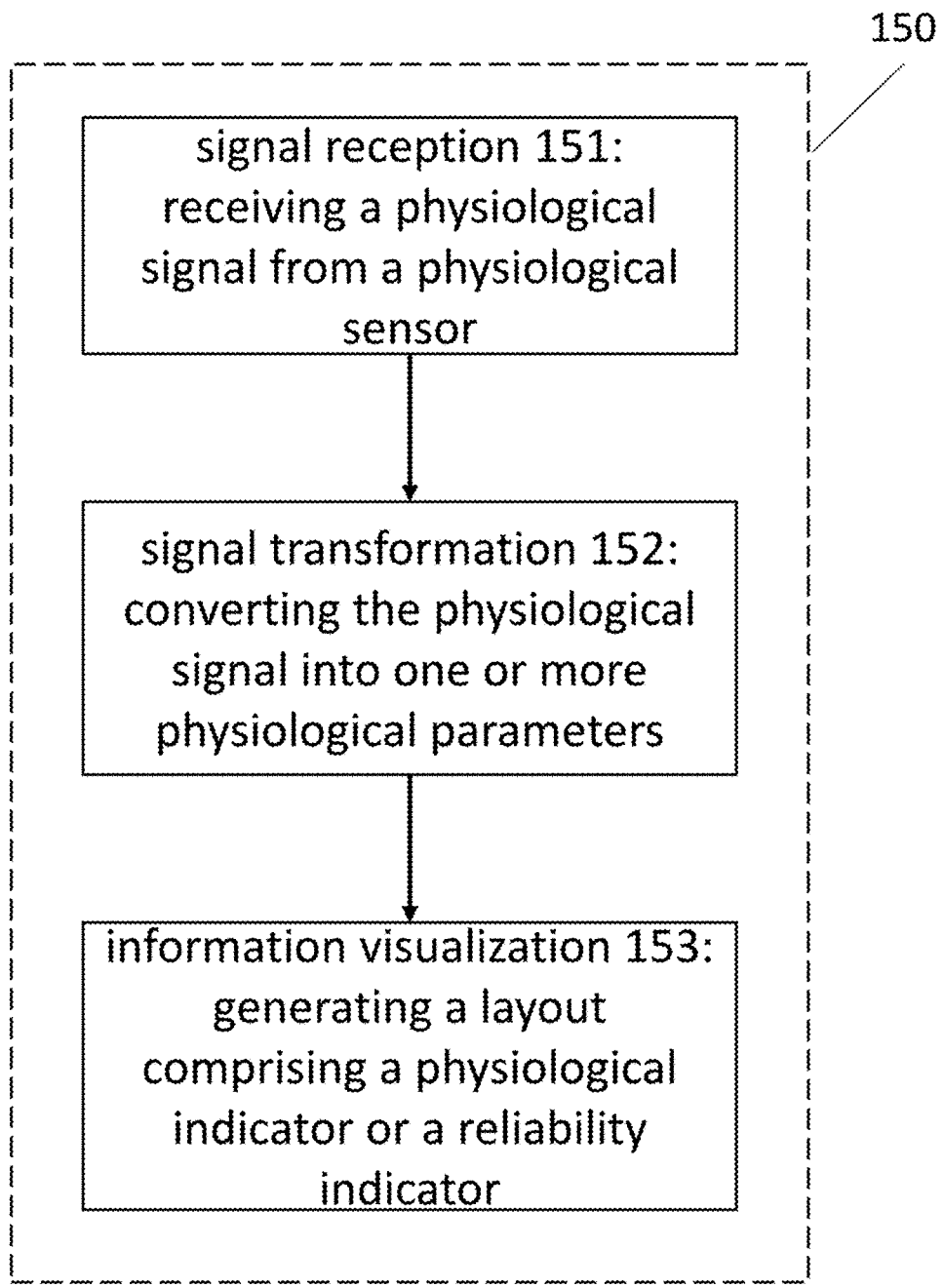
FIG. 5 illustrates a flow diagram of a physiological parameter visualization process 150 performed by a wearable smart device 900 comprising a physiological sensor 960.
Figure 6A:
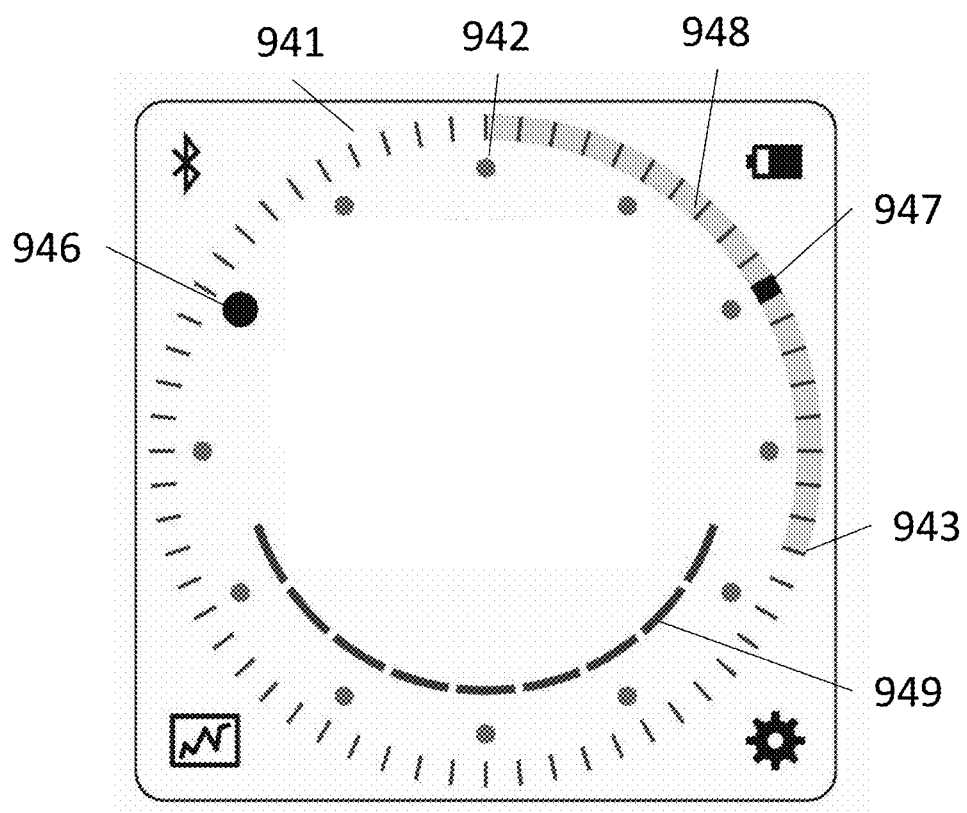
FIG. 6A illustrates the layout comprising a physiological indicator 949 generated from a physiological parameter visualization process 150 performed by a wearable smart device 900 comprising a physiological sensor 960.

A wearable smart device 900 may comprise a microprocessor 910, a memory 911, a power source 912, a wearable housing 920, a display 930, and a physiological sensor 960 to perform information delivery process, wherein the information delivery process may be embodied as a physiological parameter visualization process 150 (FIG. 5). In one embodiment, signal reception step 151 is to receive a physiological signal from a physiological sensor 960. For example, a physiological sensor 960 may be a reflective optical oximeter and the physiological signal may be the difference of the electrical currents generated from the photodiodes detecting two different wavelength of visible light reflected from a user's skin. Then, signal transformation step 152 is to convert the physiological signal into one or more physiological parameters, such as the fraction of oxygen-saturated hemoglobin relative to total hemoglobin, blood sugar, or heart beat per minute. The information may be a physiological parameter alone (for example, blood oxygen saturation), or the combination of multiple parameters. The information visualization step 153 is to generate a layout comprising a physiological indicator 949 or a reliability indicator 950, which may be a curved band, or a dotted line. Specifically, one of the characteristics (for example, color or length) of the physiological indicator 949 may change according to the physiological parameter. In the example shown in FIG. 6A, the length or the brightness of a physiological indicator 949 is proportional to the physiological parameter. Also, a reliability parameter is useful for evaluating performance of a physiological parameter because the contact of the physiological sensor in a wearable device may not be adequate due to user's motion, skin moisture or failure of the physiological sensor. In the other example, signal transformation step 152 is to convert the physiological signal into a reliability parameter. In one example, the physiological sensor is an optical reflective sensor and the reliability parameter is the ratio of the difference of the amount of reflected light to the total reflected light. The length or the brightness of the reliability indicator may be proportional to the reliability parameter. A reliability indicator may represent information of a physiological parameter and a reliability parameter.

Figure 6B:
FIG. 6B illustrates the layout comprising a physiological indicator 949 and a reliability indicator 950 generated from a physiological parameter visualization process 150 performed by a wearable smart device 900 comprising a physiological sensor 960.

As shown in FIG. 6B, the reliability indicator 950 is a discontinuous curved band indicating the value of physiological parameters by color change. For example, the color temperature may be changed according to measured blood oxygen saturation. In the example, the length of the reliability indicator is proportional to the physiological parameter and the brightness of the reliability indicator is proportional to the reliability parameter. Alternatively, the brightness of the reliability indicator is proportional to the physiological parameter and the length of the reliability indicator is proportional to the reliability parameter.

Also, a wearable smart device 900 further comprising an inertial sensor 980 may perform a layout orientation process 350. Signal reception step 351 is to convert acceleration or motion status of a wearable smart device into an electrical signal. For example, an accelerometer may detect acceleration of the wearable smart device 900 and generate a vector signal indicating orientation of gravity. Then, signal transformation step 352 is to convert the vector signals into spatial information indicating the orientation of the wearable smart device 900. Furthermore, information visualization step 353 is to assign the orientation of the layout shown on the display 930.

Figure 7A:
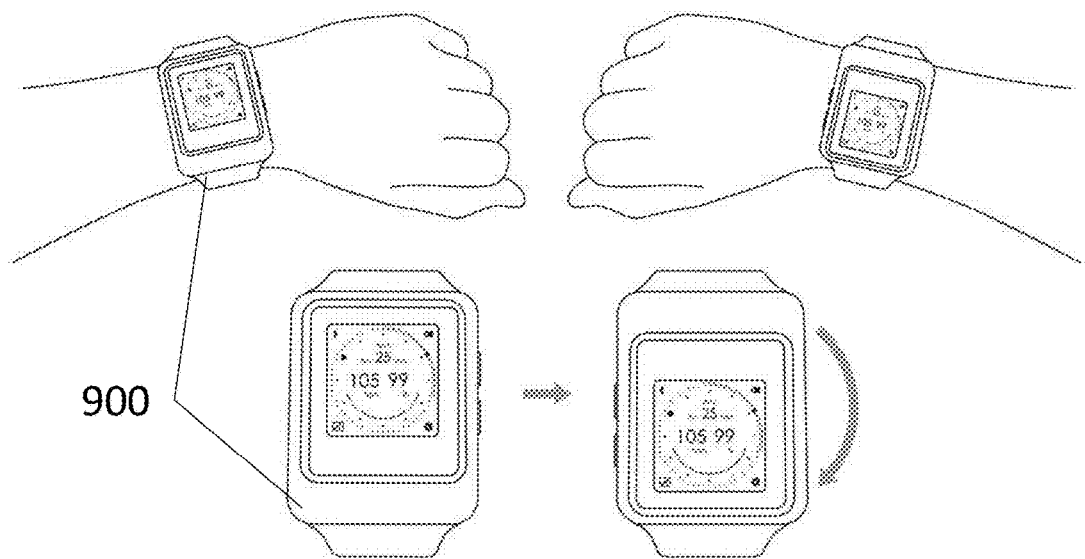
FIGS. 7A &7B illustrates the layouts generated from layout orientation process 300 performed by a wearable smart device 900 comprising a physiological sensor 960.
Figure 7B:
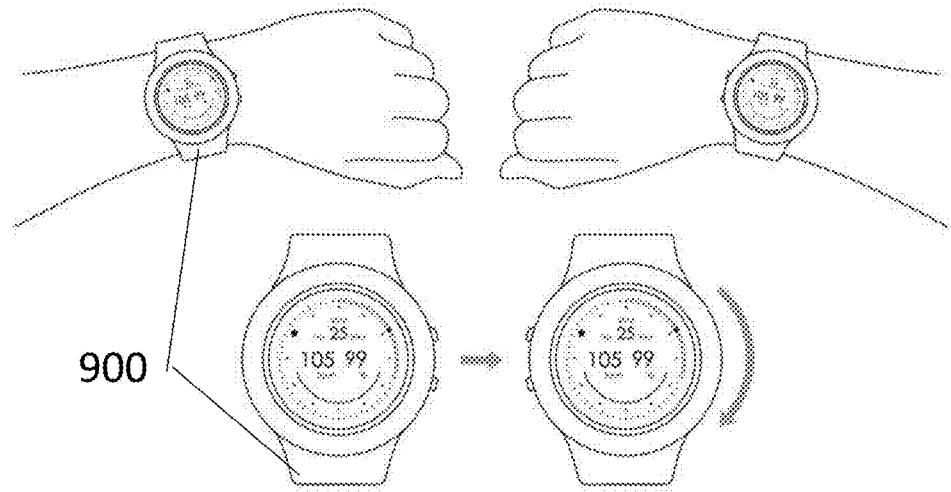

A wearable smart device 900 may comprise a microprocessor 910, a memory 911, a power source 912, a wearable housing 920, a display 930, and a physiological sensor 960 to perform an information delivery process, wherein the information delivery process may be embodied as a layout orientation process 300. Signal reception step 301 is to receive a physiological signal from a physiological sensor 960. For example, a physiological sensor 960 may be a piezoelectric transducer and the physiological signal may be the electrical potential generated from the piezoelectric material detecting the pressure wave generated from the pulsation of the radial artery. Then, signal transformation step 302 is to convert the physiological signal into one or more biometric parameters indicating that the wearable smart device 900 is worn on the user's right wrist. Furthermore, information visualization step 303 is to assign the orientation of the layout shown on the display 930. In FIGS. 7A and 7B, the information delivery process leads to the change of the layout orientation to the detected change of wearing wrist.

Figure 8A:
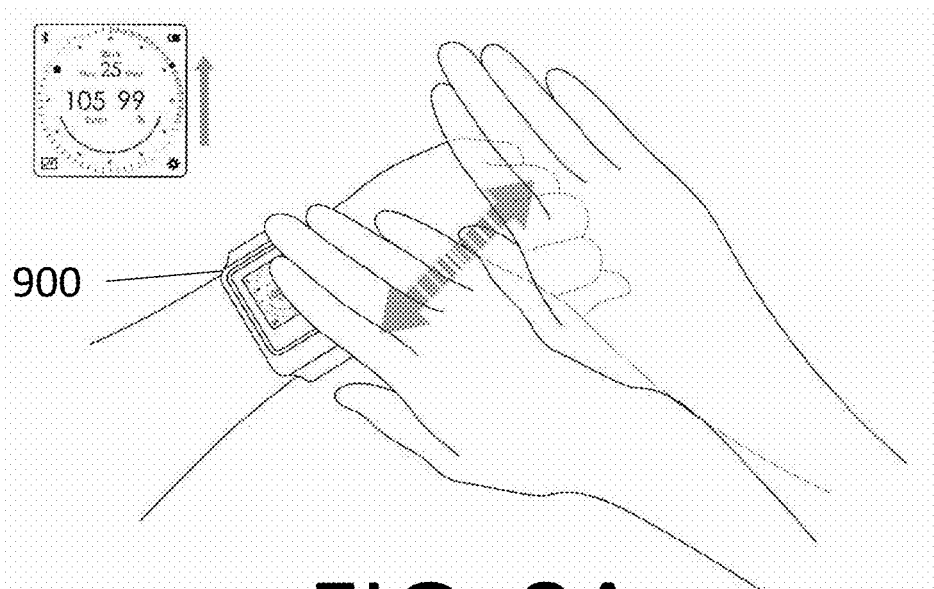
FIGS. 8A & 8B illustrates the layouts generated from layout swapping process 500 performed by a wearable smart device 900 comprising a touchscreen 931.
Figure 8B:
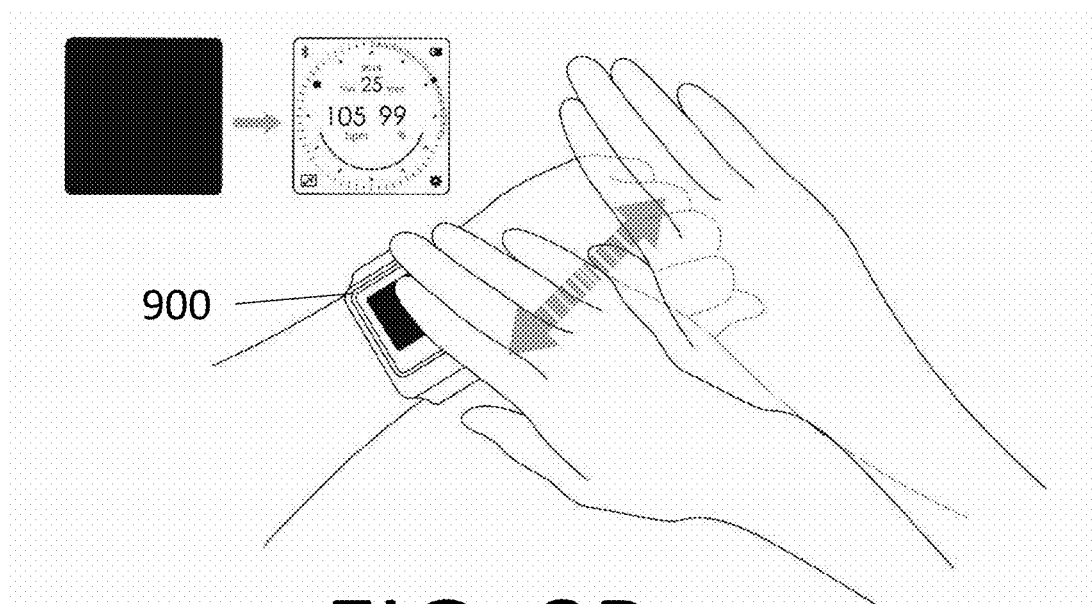

A wearable smart device 900, comprising a touchscreen 931, may perform a layout swapping process 550. In signal reception step 551, the touchscreen 931 may detect the contact or the force applied on the touchscreen by a user and generate a touch signal. Then, signal transformation step 552 is to convert the touch signals into control information, such as sliding or tapping. Furthermore, information visualization step 553 is to assign a layout to be shown on the touchscreen 931. For example, a wearable smart device 900 may detect user's contact on the touchscreen and replace a layout with time indicators and physiological indicators (FIG. 8A); a wearable smart device 900 may detect user's contact on the touchscreen to awake the wearable smart device 900 from power saving mode and show a layout on touchscreen 931 (FIG. 8B).

Figure 9A:
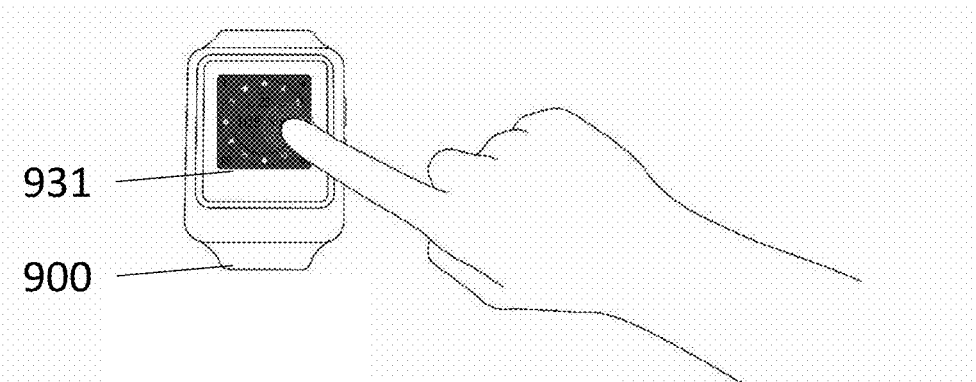
FIGS. 9A, 9B, and 9C illustrates the layouts generated from a layout selection process comprising sequential information delivery processes 100 performed by a wearable smart device.
Figure 9B:
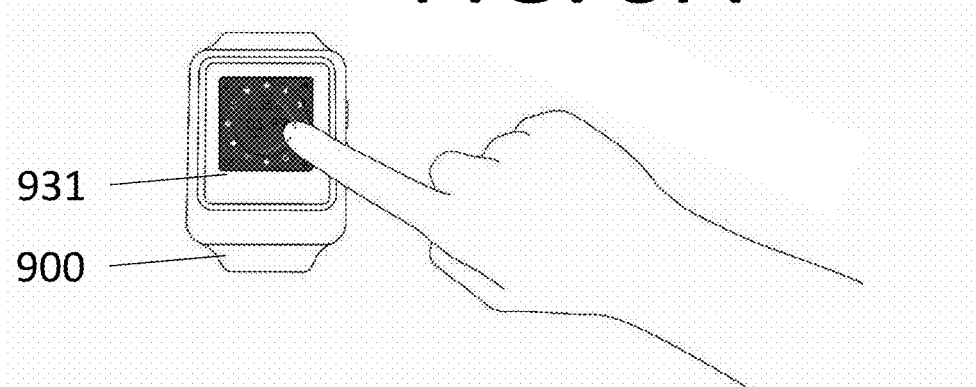
Figure 9C:
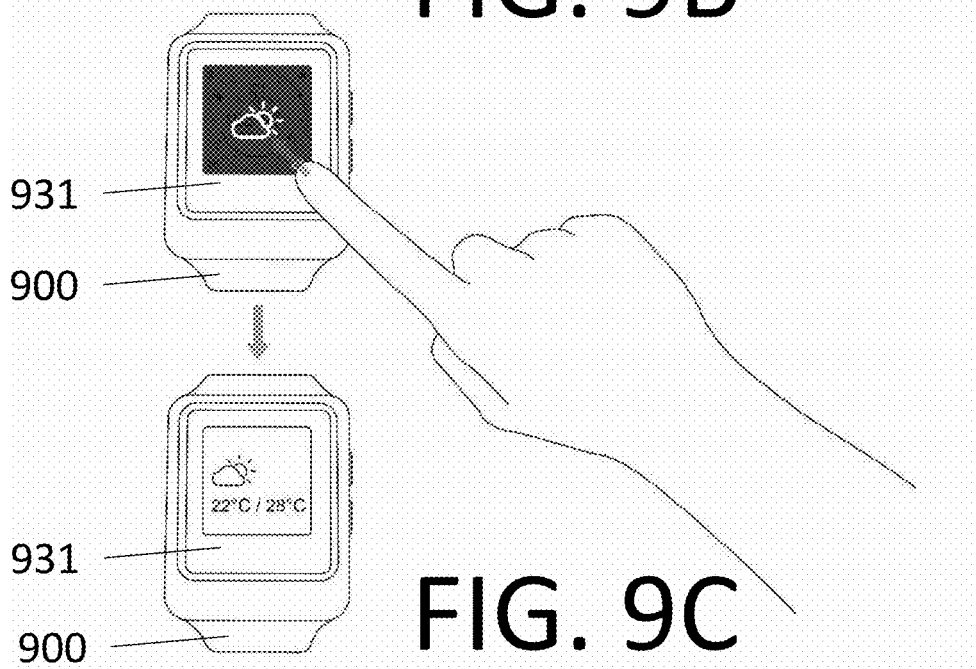

Also, a wearable smart device 900, comprising a touchscreen 931, may perform a layout selection process comprising sequential information delivery processes. The touchscreen 931 of a wearable smart device 900 may detect a latent period of the contact or the force applied by a user and generate a touch signal. The wearable smart device 900 then convert the touch signals into control information, and generate a layout comprising a group of optional icons (FIG. 9A). Subsequently, the wearable smart device 900 may further detect dynamic touch signals and convert the signals into control information, such as sliding (FIG. 9B), so that the touchscreen 931 may show a layout comprising rotated arrangement of the icons. Last, the wearable smart device 900 may further detect touch signals and convert the signals into control information, such as a latent period of touch signal into selection confirmation (FIG. 9C). The touchscreen 931 may show a layout comprising an enlarged selected icon and then a layout with corresponding information.

Figure 10:
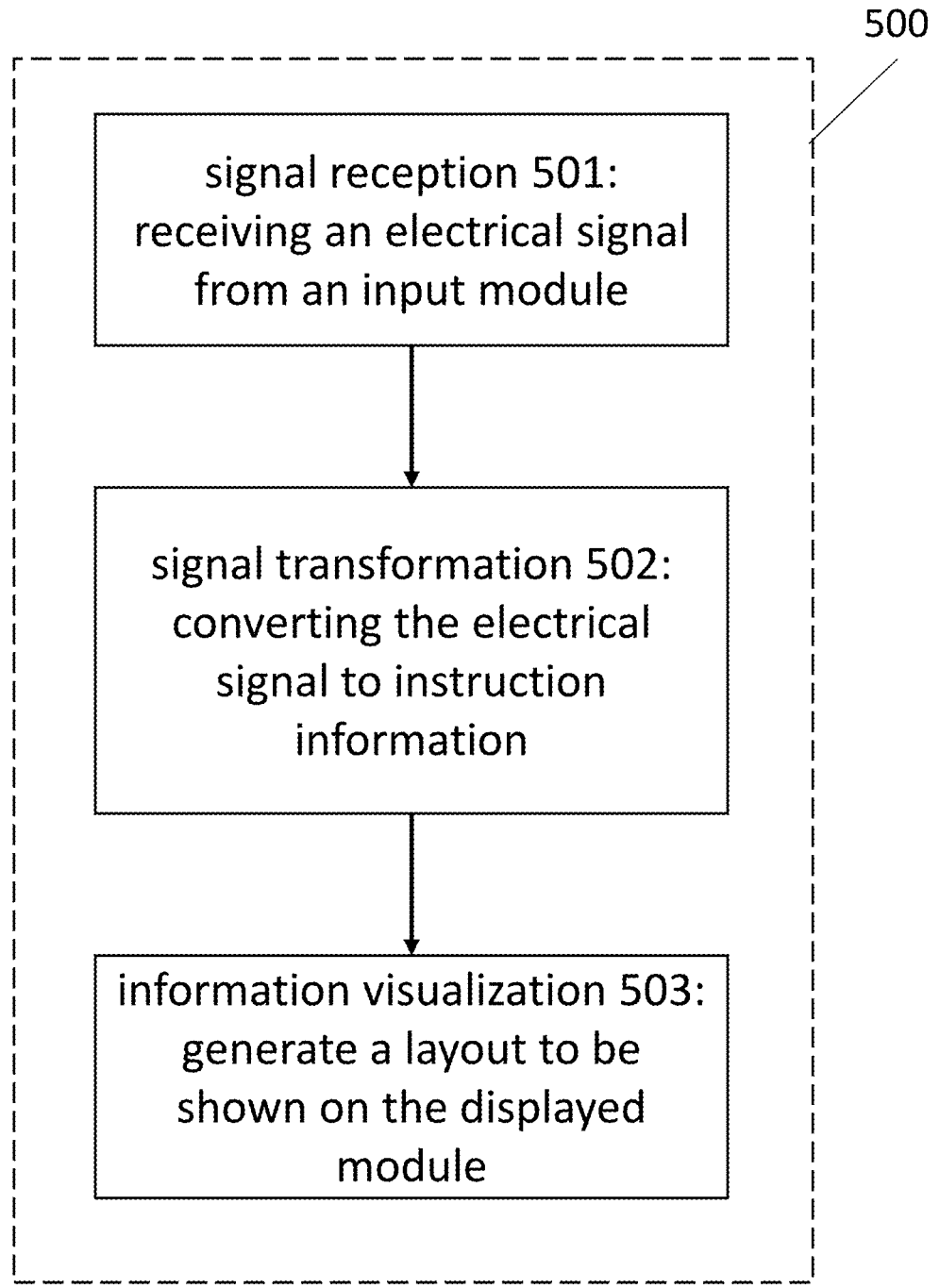
FIG. 10 illustrates a flow diagram of a layout swapping process 500 performed by a wearable smart device 900 comprising an input module 970.
Figure 11A:
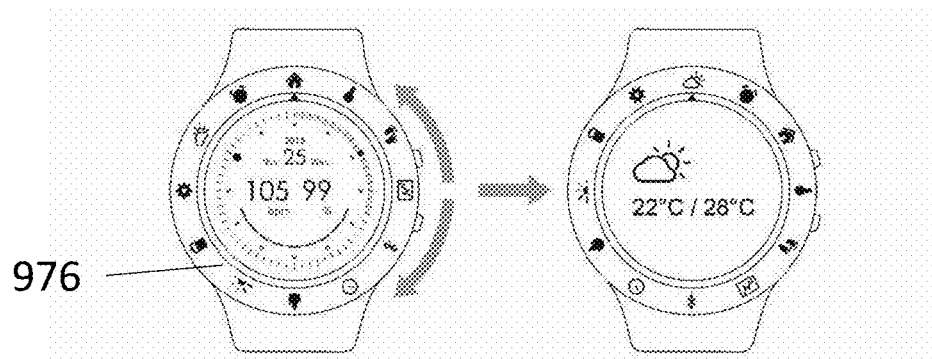
FIGS. 11A, 11B, and 11C illustrates the layouts generated from layout swapping process 500 performed by a wearable smart device 900.
Figure 11B:
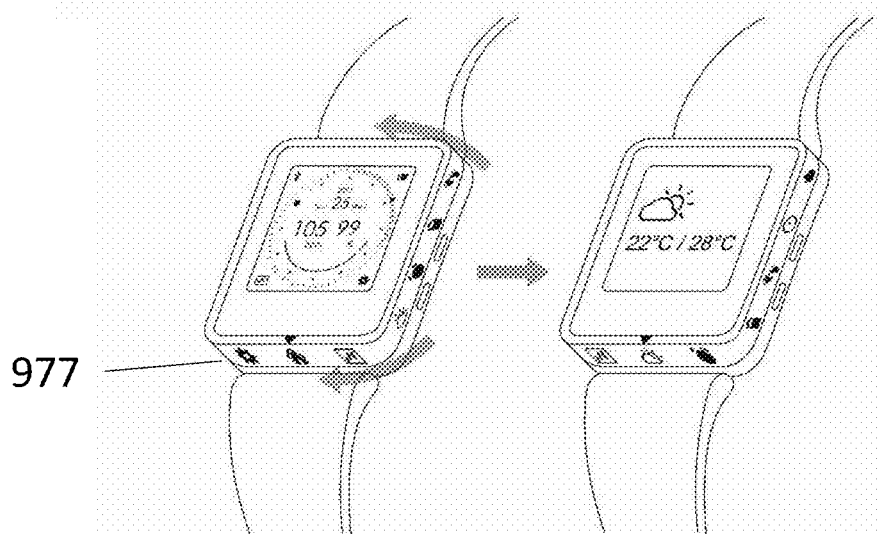
Figure 11C:
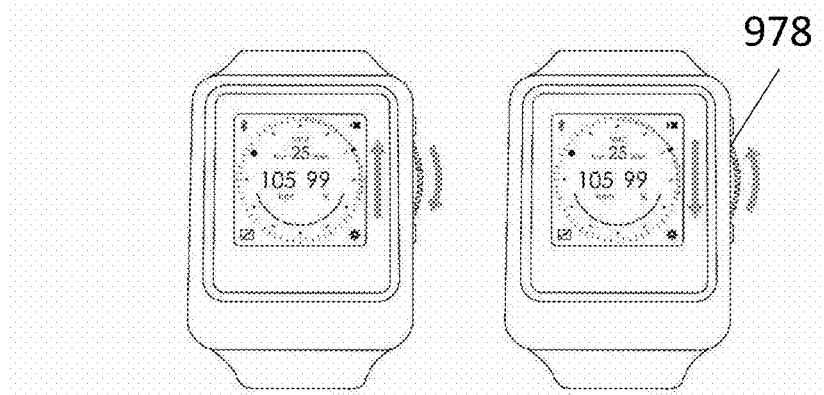

A wearable smart device 900 may comprise a microprocessor 910, a memory 911, a power source 912, a wearable housing 920, a display 930, and an input module 970 to perform an information delivery process, wherein the information delivery process may be embodied as a layout swapping process 500 (FIG. 10). Signal reception step 501 is to receive an electrical signal from an input module 970. For example, an input module 970 may be a rotatable input module (for example, a rotatable watch bezel 976) and the electrical signal may be the rotational position of the rotatable watch bezel 976 (FIG. 11A). Then, signal transformation step 502 is to convert the electrical signal to instruction information for generating a combination of corresponding information. Information visualization step 503 is to generate a layout to be shown on the display according to the instruction information. For example, an electrical signal is detected when a "cloud" icon on the rotatable tread 977 is rotated to the mark, and then the electrical signal is converted to instruction information indicating weather information. Next, the display 930 shows a layout including GUIs relating to weather information (FIG. 11B). Also, an input module 970 may be embodied as a rotatable gear 978 so that a wearable smart device 900 may perform the information delivery process to generate a layout (FIG. 11C). In addition, an input module may further comprise a physical switch to receive a physical press and to trigger an electrical signal. For example, in FIG. 11A, a user may rotate the rotatable bezel to perform an information process to display the selected layout. Then the user press the rotatable bezel to activate the physical switch so that the selected layout may be shown constantly or the selected function may be activated. As well, in FIG. 11C, the physical switch in the rotatable gear may receive a physical press parallel or perpendicular to the axis of the rotatable gear, and then the smart wearable device may display a selected layout or may activate a selected function.

Furthermore, the information delivery process may be embodied as a function switching process. Similarly, signal reception step is to receive an electrical signal from an input module 970, and signal transformation step converts the electrical signal to an instruction to switch one of the functions of a wearable smart watch. Finally, information visualization step is to generate a function switching layout comprising GUIs with corresponding function. For example, an optical physiological sensor may be utilized to detect blood sugar and be switched to detect blood oxygen saturation.

What is claimed is:

1. A wearable device for information delivery, comprising:
   a physiological sensor;
   a display;
   a microprocessor coupled to the memory, the physiological sensor and the display; and
   a wearable housing configured to accommodate the physiological sensor, the display and the microprocessor;
   wherein the microprocessor is configured to receive a physiological signal from the physiological sensor, to convert the physiological signal into a physiological parameter and a reliability parameter and to generate a layout comprising a physiological indicator according to the physiological parameter and a discontinuous curved reliability indicator according to the physiological parameter and the reliability parameter; and the display is configured to render the layout,
   a length of the curved reliability indicator is proportional to the physiological parameter, and a brightness of the curved reliability indicator is proportional to the reliability parameter.

2. The wearable device of claim 1, further comprising a clock generator; wherein the microprocessor receives a clock signal from the clock generator and assign the clock signal as time parameters; wherein the layout further comprises:
   a preset clock dial comprising twelve dot markings and sixty line markings;
   a first time indicator over the dot marking at the location of corresponding time parameter; and
   a second time indicator over the line marking at the location of corresponding time parameter.

3. The wearable device of claim 1, further comprising an input module; wherein the microprocessor receives an input signal from the input module, converts the input signal into instruction information and swaps a different layout on the display according to the instruction information.

4. The wearable device of claim 3, wherein the input module is selected from a group consisting of a rotatable bezel, a rotatable tread and a rotatable gear.

5. The wearable device of claim 4, wherein the microprocessor switches the function of the physiological sensor according to the instruction information.

6. The wearable device of claim 1, further comprising an inertial sensor; wherein the microprocessor receives a motion signal from the inertial sensor, converts the motion signal into orientation information and assign the orientation of the layout shown on the display according to the orientation information.

7. A method for information delivery performed by a wearable device comprising a physiological sensor, a display and a microprocessor comprising:
  a signal reception step to receive, at the microprocessor, a physiological signal from the physiological sensor;
  a signal transformation step to convert, at the microprocessor, the physiological signal into a physiological parameter and a reliability parameter;
  an information visualization step to generate, at the microprocessor, a layout comprising a physiological indicator according to the physiological parameter and a discontinuous curved reliability indicator according to the physiological parameter and the reliability parameter and to render the layout on the display,
  a length of the curved reliability indicator is proportional to the physiological parameter, and a brightness of the curved reliability indicator is proportional to the reliability parameter.

8. The method of claim 7, further comprising receiving a clock signal from a clock generator and assigning the clock signal as time parameters;
  wherein the layout generated in the information visualization step further comprising:
  a preset clock dial comprising twelve dot markings and sixty line markings;
  a first time indicator over the dot marking at the location of corresponding time parameter; and
  a second time indicator over the line marking at the location of corresponding time parameter.

9. The method of claim 7, further comprising receiving an input signal from an input module, converting the input signal into instruction information and swapping the layout on the display according to the instruction information.

10. The method device of claim 9, wherein the input module is selected from a group consisting of a rotatable bezel, a rotatable tread and a rotatable gear.

11. The method device of claim 10, further comprising switching the function of the physiological sensor according to the instruction information, at the microprocessor.

12. The method of claim 7, further comprising the steps performed at the microprocessor: receiving a motion signal from the inertial sensor, converting the motion signal into orientation information and assigning the orientation of the layout shown on the display according to the orientation information.

* * * * *